United States Patent [19]

Hayashi et al.

[11] Patent Number: 5,016,737
[45] Date of Patent: May 21, 1991

[54] BRAKE DEVICE FOR VEHICLES

[75] Inventors: Tsutomu Hayashi, Tokyo; Takeshi Kawaguchi; Tetsuo Tsuchida, both of Saitama, all of Japan

[73] Assignee: Honda Giken Kogyo Kabushiki Kaisha, Tokyo, Japan

[21] Appl. No.: 409,965

[22] Filed: Sep. 18, 1989

Related U.S. Application Data

[63] Continuation of Ser. No. 208,842, Jun. 17, 1988, abandoned, which is a continuation of Ser. No. 119,822, Nov. 12, 1987, abandoned, which is a continuation of Ser. No. 737,390, May 23, 1985, Pat. No. 4,733,757.

[30] Foreign Application Priority Data

May 26, 1984 [JP] Japan .................. 59-106916
Oct. 26, 1984 [JP] Japan .................. 59-225396

[51] Int. Cl.$^5$ .............................. B60F 8/08
[52] U.S. Cl. .................. 188/181 A; 188/181 R
[58] Field of Search ........... 188/181 A, 181 R, 187, 188/72.5; 303/22.1, 22.4, 228

[56] References Cited

U.S. PATENT DOCUMENTS

| 3,731,767 | 5/1973 | Lefort | 303/21 |
| 4,036,331 | 7/1977 | Hayashi et al. | 188/187 |
| 4,225,020 | 9/1980 | Bloomberg | 303/22 R X |
| 4,456,099 | 6/1984 | Kawaguchi | 188/72.5 |
| 4,456,309 | 6/1984 | Rath | 303/10 |
| 4,494,800 | 1/1985 | Hayashi | 303/6 A |

FOREIGN PATENT DOCUMENTS 495146 8/1953 Canada .
2070166 9/1981 United Kingdom .

Primary Examiner—Matthew C. Graham
Attorney, Agent, or Firm—Lyon & Lyon

[57] ABSTRACT

A brake device for vehicles applying brake power to a wheel through actuation of a disc brake by an output hydraulic pressure from a master cylinder, wherein an inertial type wheel angular deceleration sensor driven by the wheel through a transmission device is incorporated in an antilock control unit adapted to control the output hydraulic pressure of the master cylinder, the disc brake and the transmission device are enclosed in an annular recess open to one side of the wheel, and a caliper of the brake and the antilock control unit are supported on a fixed panel disposed so as to close an opening of the annular recess.

9 Claims, 8 Drawing Sheets

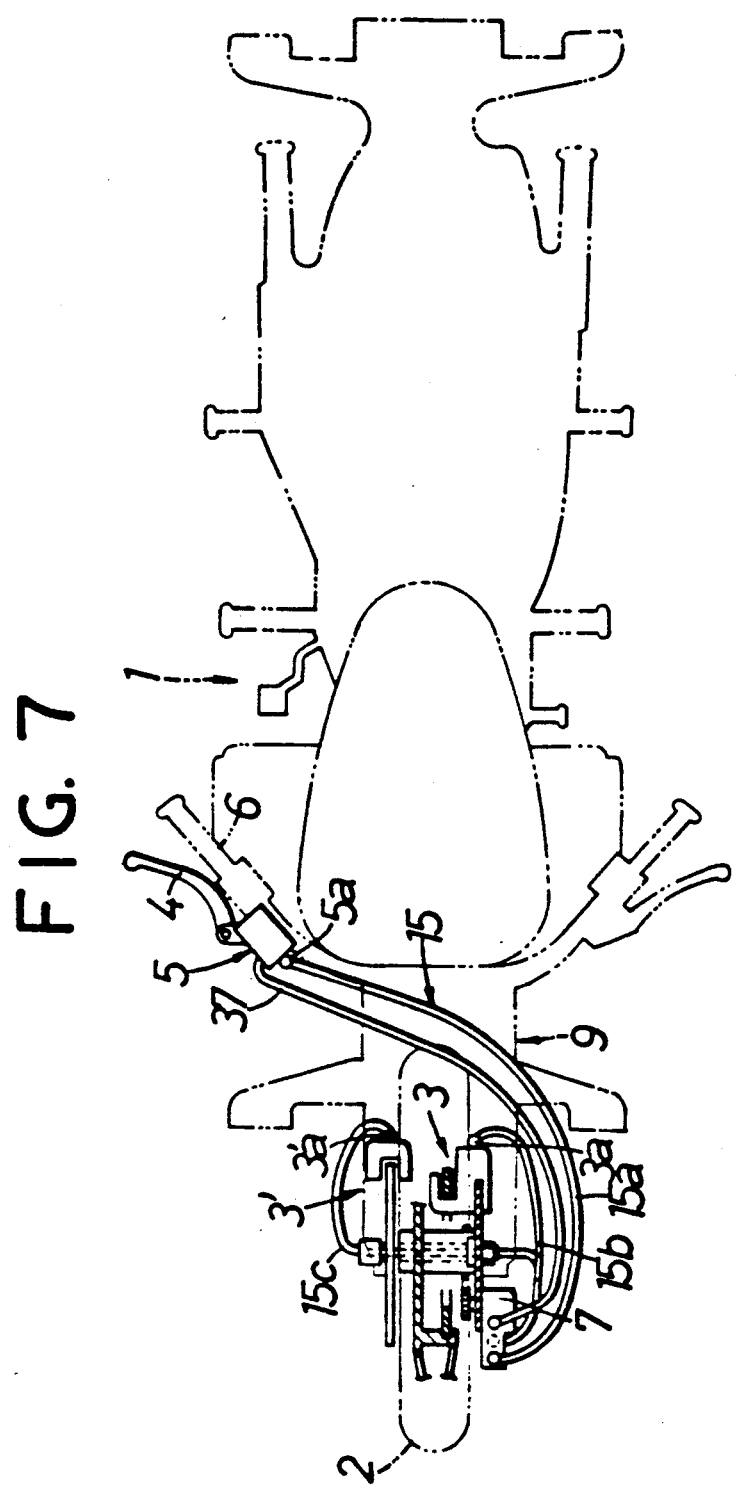

BRAKE DEVICE FOR VEHICLES

This application is continuation of application Ser. No. 07/208,842, filed on 06/17/88 and now abandoned, which is a continuation of application Ser. No. 07/119,822, filed on 11/12/87 and now abandoned, which is continuation of application Ser. No. 06/737,390, filed on 5/23/90 and now U.S. Pat. No. 4,733,757.

BACKGROUND OF THE INVENTION

1. Field of the Invention

This invention relates to a brake device for vehicles such as motorcycle, automobile and the like, and is particularly concerned with a device comprising a master cylinder, a disc brake actuated on an output hydraulic pressure of the master cylinder to apply a brake power on a wheel, an antilock control unit incorporating an inertia type wheel angular deceleration sensor driven through a transmission device from the wheel and controlling the output hydraulic pressure of the master cylinder according to an output of the sensor.

2. Description of the Prior Art

The brake device described above is already known as disclosed in, for example, Japanese Patent Publication Laid-Open No. 120440/1981.

Since a disc brake and an antilock control unit are provided side by side radially at a location outside the wheel in such a conventional brake device, the device must be complicated and inconveniently large because the support structures for both are to be provided separately and particularly because a means for covering a transmission device for transmitting the rotation force of the wheel to the antilock control unit must be provided.

SUMMARY OF THE INVENTION

An object of this invention is to provide a brake device wherein the above-mentioned defects have been removed.

To attain the above object, the invention provides a brake device wherein the disc brake is enclosed in an annular recess opening to one side of the wheel, a caliper of the disc brake and the antilock control unit are supported on a fixed panel disposed so as to close an opening of the annular recess, the transmission device is enclosed in the annular recess.

Since the antilock control unit and the brake caliper are supported on the fixed panel according to such construction, a bracket need not be provided particularly for supporting the unit, and hence the brake device can be constituted simply and compactly. Further, the transmission device between the wheel and the antilock control unit is enclosed in the annular recess open to one side of the wheel and also covered by the fixed panel, therefore the panel serves as a covering means for the transmission device, and thus an influence to be exerted on the transmission device by external disturbance such as rain water or the like will be minimized without employing any special covering means, and the structure can be simplified further.

In addition to the above construction, when one more disc brake is further installed on the wheel, the brake will be disposed as an outboard type disc brake on the side opposite that on which the above-mentioned disc brake of the wheel is provided, then the two disc brakes and the antilock control unit can be located adjacently to each other, the brake device can be constituted compact as a whole despite additional provision of the second disc brake, which is particularly effective in mounting on motorcycles.

Objects, features and advantages other than the above-mentioned in the invention will be made clear from preferred embodiments described in detail with reference to the accompanying drawings.

BRIEF DESCRIPTION OF THE DRAWINGS

The drawings represent embodiments of this invention, wherein FIG. 7 is a schematic plan view of a motorcycle provided with a brake device according to a second embodiment of this invention.

DETAILED DESCRIPTION OF PREFERRED EMBODIMENTS

Figure 1:
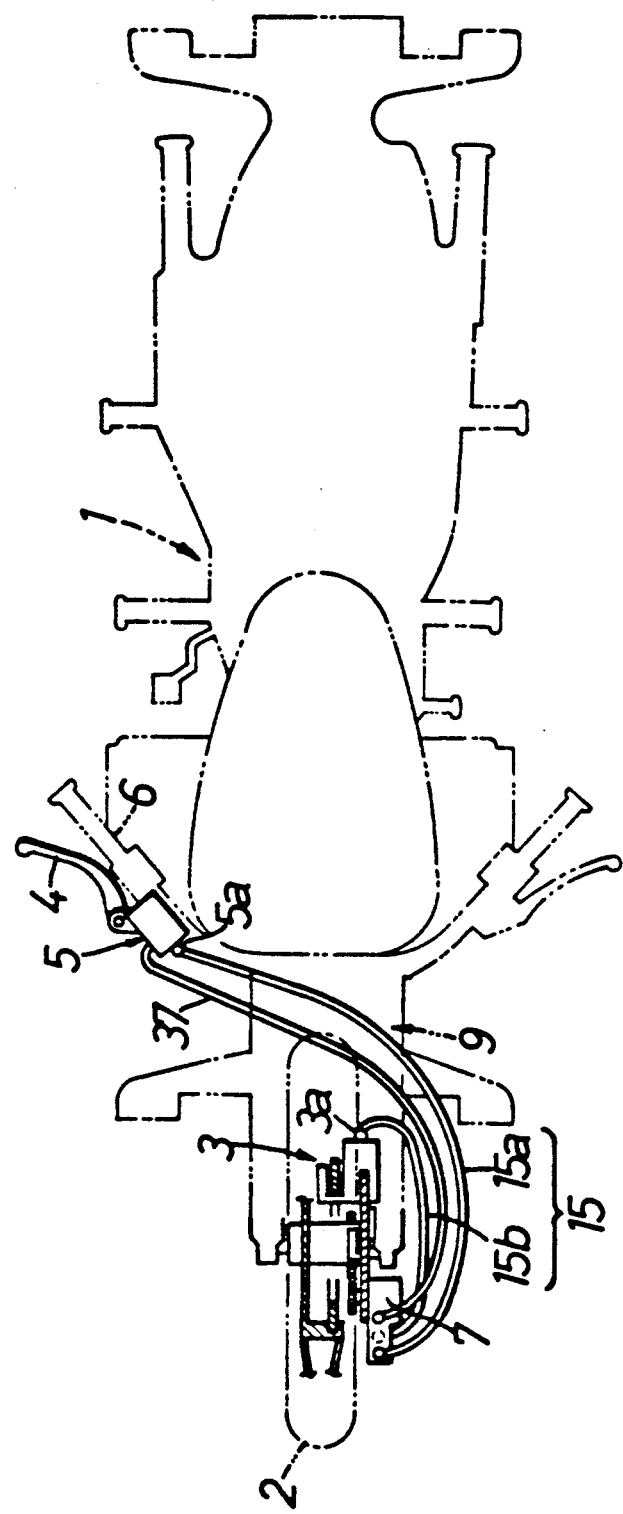
FIG. 1 is a schematic plan view of a motorcycle provided with a brake device according to a first embodiment of the invention.

Two embodiments of the invention will now be described with reference to the drawings. Like members in the embodiments are identified by the same reference characters.

First, in FIG. 1 representing the first embodiment, a brake device for a front wheel 2 on a motorcycle 1 comprises a master cylinder 5 provided on a steering handle 6 and operable by a brake lever 4, a disc brake 3 for applying brake power to the front wheel 2 on receipt of an output hydraulic pressure of the master cylinder 5, and an antilock control unit 7 interposed in a hydraulic conduit 15 connecting between an output port 5a of the master cylinder 5 and an input port 3a of the disc brake 3. The unit 7 controls the output hydraulic pressure of the master cylinder 5.

Figure 2:
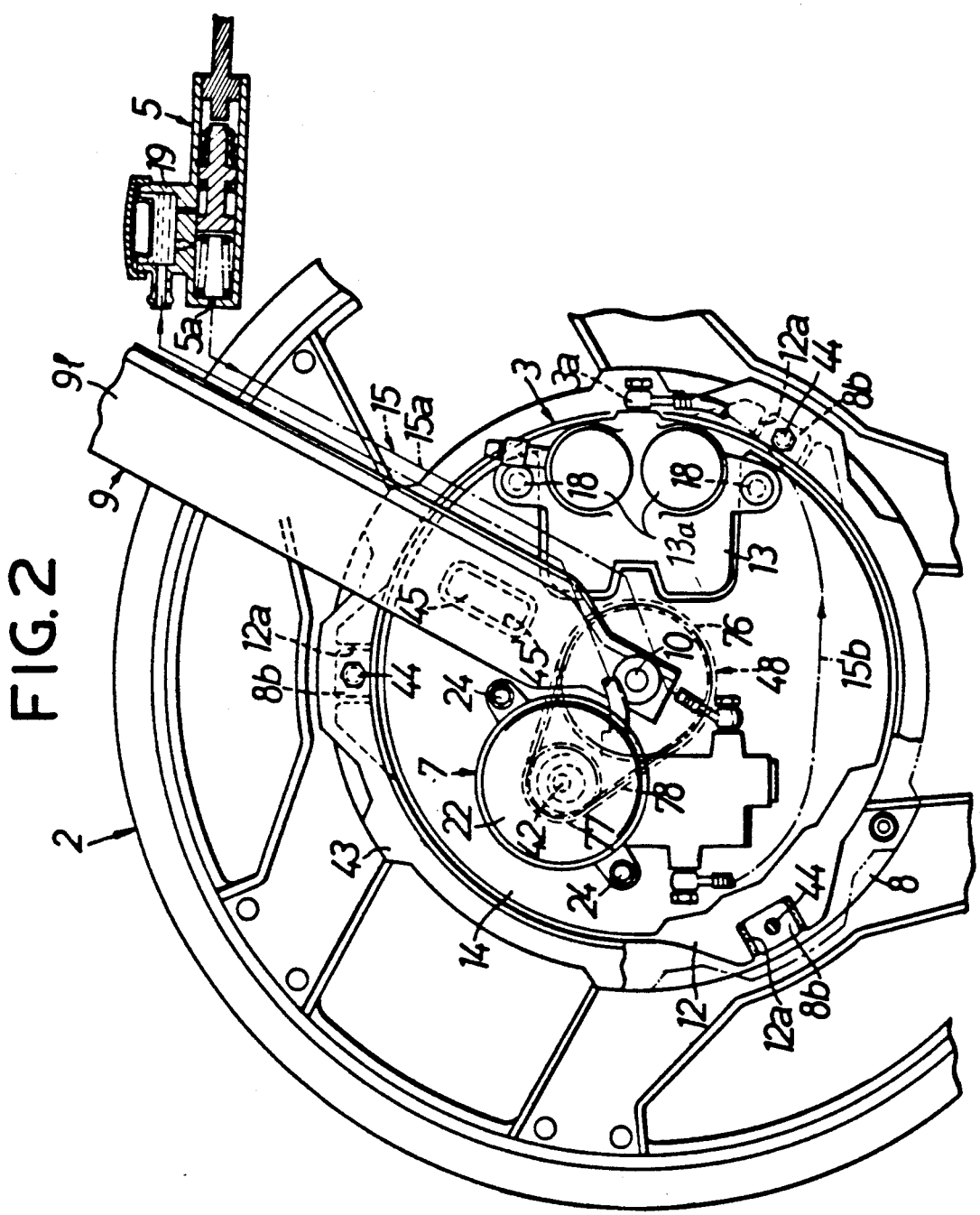
FIG. 2 is an enlarged side view of a main part of FIG. 1.
Figure 3:
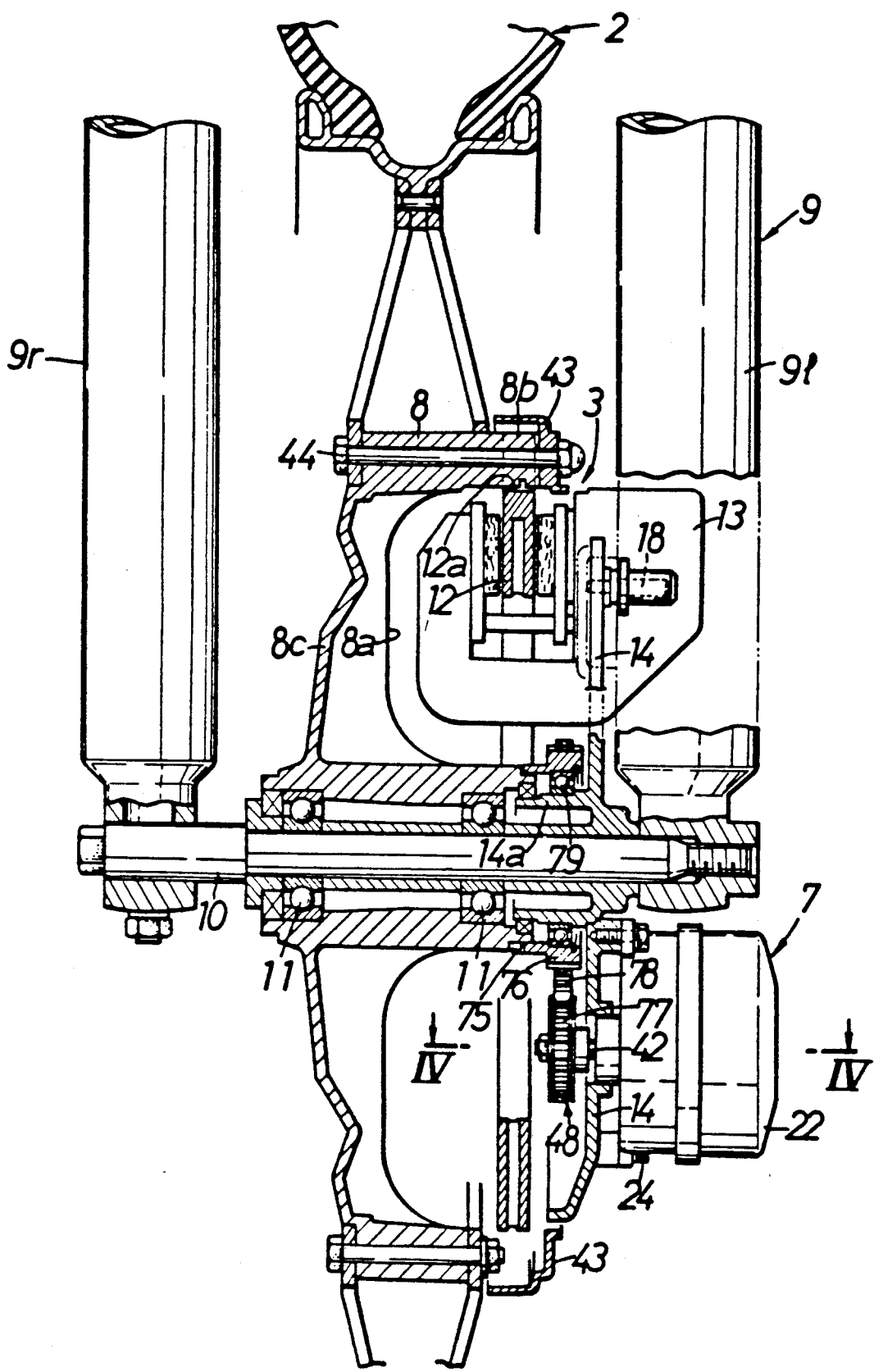
FIG. 3 is a longitudinal sectional view of FIG. 2.

In FIG. 2 and FIG. 3, the front wheel 2 has a hub 8 borne through bearings 11, 11 on an axle 10 with both ends fixed to a pair of left and right fork legs 9l, 9r. These fork legs constitute a front fork 9 of the motorcycle 1.

An annular recess 8a is formed on the hub 8 open on one side of the hub, and the disc brake 3 is enclosed in the annular recess 8a.

The disc brake 3 is constituted of an annular brake disc 12 and a brake caliper 13 straddling over the brake disc 12 from the inner peripheral side and capable of clamping the brake disc 12 by hydraulic pressure, and the brake disc 12 is coupled to the hub 8 fixedly in the direction of rotation with a plurality of notches 12a formed on its outer periphery being engaged with a plurality of projections 8b provided on an end surface of the hub 8. An annular cover 43 covering an outer periphery of the brake disc 12 is fixed on the end surface of the hub 8 by bolts 44. On the other hand, the brake caliper 13 with the caliper cylinders 13a is supported on a fixed panel 14 slidably in an axial direction of the axle 10 through a pair of sliding pins 18, 18.

The fixed panel 14 is mounted on the axle 10 in such manner as to close an opening of the annular recess 8a and is also coupled to the adjacent fork leg 9l through engagement of a convexity 45' with a recess 45 so as not to rotate around the axle 10.

A casing 22 of the antilock control unit 7 is fixed further to an outside surface of the fixed panel 14 by bolts 24. A drive shaft 42 projecting from the casing 22 into the annular recess 8a through the fixed panel 14 and is coupled to the hub 8 through a transmission device 48.

The transmission device 48 is constituted of a toothed driving pulley 76 coupled to an end surface of the central part of the hub 8 through a dog joint 75, a toothed driven pulley 77 fixed to the drive shaft 42, and a toothed belt 78 laid between both the pulleys 76, 77. The driving pulley 76 is borne through a bearing 79 rotatably on a boss 14a provided projectingly on an inside surface of the fixed panel 14. Then, a gear ratio between the toothed pulleys 76, 77 is selected so as to drive the driven pulley 77 acceleratingly from the driving pulley 76.

Figure 4:
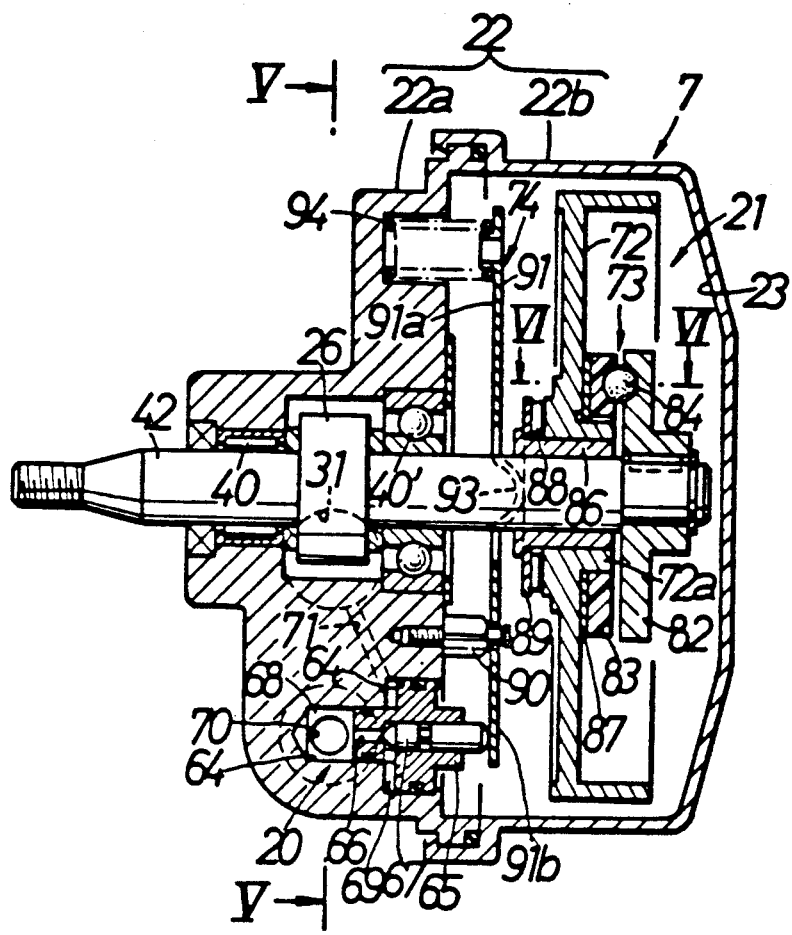
FIG. 4 is a sectional view taken on line IV—IV of FIG. 3, FIG. 5 and FIG. 6 are sectional views taken on lines V—V and VI—VI of FIG. 4 respectively.
Figure 6:
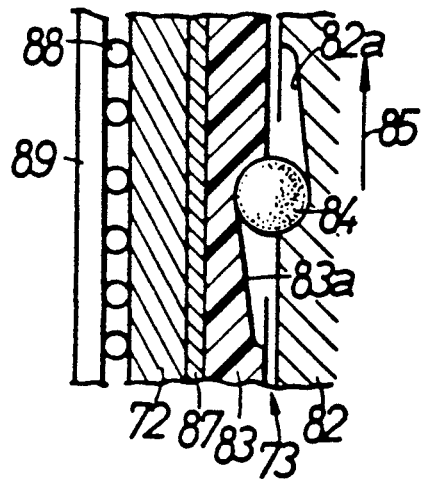
Figure 5:
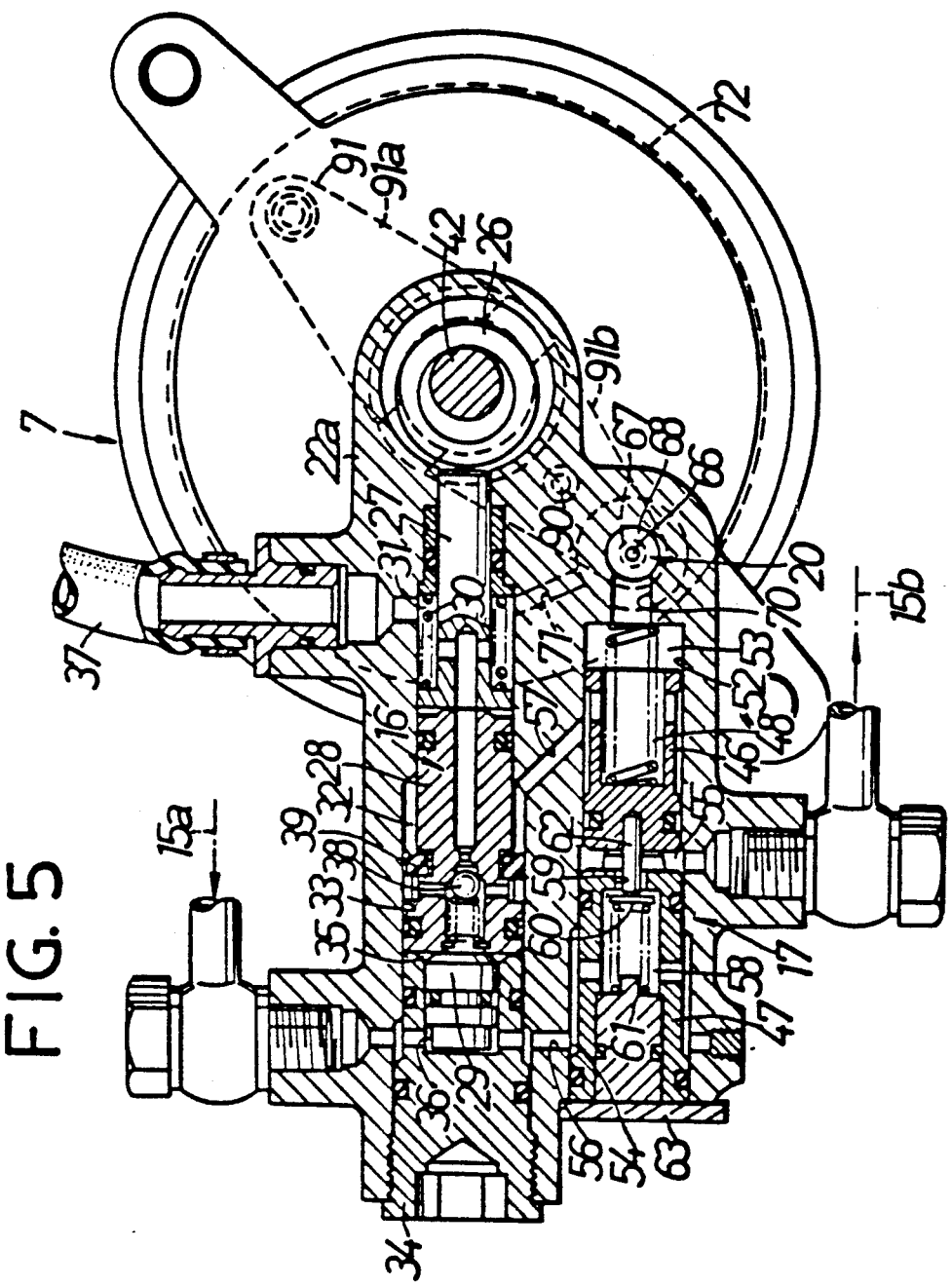

As illustrated in FIG. 4 and FIG. 5, the antilock control unit 7 has a casing 22 constituted of a casing body 22a bearing the drive shaft 42 rotatably through bearings 40, 40', and a cup-like cover 22b fitted in one end of the casing body 22a and defining a sensor chamber 23 therewith. A hydraulic pump 16, a modulator 17, an exhaust pressure valve 20 and an inertia type wheel angular deceleration sensor 21 are housed in the casing 22.

The hydraulic pump 16 is constituted of an eccentric cam 26 formed on the drive shaft 42 between both the bearings 40, 40', a push rod 27 disposed with its inner end opposed to the eccentric cam 26, a pump piston 28 in contact with an outer end of the push rod 27, an actuating piston 29 in contact with an outer end of the pump piston 28, and a return spring 30 biassing a push rod 27 in the direction away from the eccentric cam 26.

The push rod 27 and the pump piston 28 are slidably fitted in a first cylinder hole 33 formed on the casing body 22a to define an inlet chamber 31 and an outlet chamber 32 around their outer peripheries respectively. Further, a plug 34 is fitted to an outer end portion of the first cylinder hole 33 so as to form a pump chamber 35 together with the pump piston 28, and the actuating piston 29 is slidably fitted in the plug 34 so as to form a hydraulic chamber 36.

The inlet chamber 31 is kept communicating with an oil tank 19 through a conduit 37 and also with the pump chamber 35 through a suction valve 38, and the pump chamber 35 is kept communicating with the outlet chamber 32 through a unidirectional sealing member 39 functioning as a discharge valve. Then, the hydraulic chamber 36 is connected to an upstream pipe 15a of the hydraulic conduit 15 so as to communicate at all times with the output port 5a of the master cylinder 5.

The modulator 17 is constituted of a pressure reducing piston 46, a fixed piston 47 engageable with one end of the pressure reducing piston 46 to regulate the retraction limit of the latter, and a return spring 48 for biassing the piston 46 in the direction to contact the fixed piston 47, and both the pistons 46, 47 are slidingly fitted in a second cylinder hole 52 formed on the casing body 22a adjacently the first cylinder hole 33.

In the second cylinder hole 52, the pressure reducing piston 46 defines a hydraulic control chamber 53 together with an inner end wall of the second cylinder hole 52 and also defines an output hydraulic chamber 55 against the fixed piston 47, and the fixed piston 47 defines an input hydraulic chamber 54 around its outer periphery. The input hydraulic chamber 54 is kept communicating with the hydraulic chamber 36 of the hydraulic pump 16 through an oil passage 56, the output hydraulic chamber 55 is connected to a downstream pipe 15b of the hydraulic conduit 15 so as to communicate at all times with the input port 3a of the disc brake 3, and the hydraulic control chamber 53 is kept communicating with the outlet chamber 32 of the hydraulic pump 16 through an oil passage 57.

The fixed piston 47 is provided with a valve chamber 58 communicating at all times with the input hydraulic chamber 54, and a valve port 59 for keeping the valve chamber 58 in communication with the output hydraulic chamber 55. A valve body 60 for opening and closing the valve port 59 and a valve spring 61 for pressing the valve body 60 to the closing side are enclosed in the valve chamber 58. Further, a valve opening rod 62 for moving the valve body 60 to an open position is provided projectingly on one end surface of the pressure reducing piston 46, and the valve opening rod 62 keeps the valve body 60 open when the pressure reducing piston 46 is positioned at the retraction limit.

An outside opening of the second cylinder hole 52 is closed by an end plate 63 fixed to the casing body 22a, and the fixed piston 47 is kept at a position coming in contact with the end plate 63 at all times by the resilience of the return spring 48 or by the hydraulic pressure introduced into the input and output hydraulic chambers 54, 55.

The exhaust pressure valve 20 is constituted of a valve seat member 65 fitted in a stepped cylinder hole 64 of the casing body 22a and a valve body 67 which slides in the valve seat member 65 for opening and closing a valve port 66. The valve seat member 65 defines an inlet chamber 68 at the small diameter end of the stepped cylinder hole 64 and an outlet chamber 69 at the large diameter end, the chambers 68, 69 communicating with each other through the valve port 66. Then, the inlet chamber 68 is kept communicating with the hydraulic control chamber 53 of the modulator 17 through an oil passage 70, and the outlet chamber 69 is kept communicating with the inlet chamber 31 of the hydraulic pump 16 through an oil passage 71. As a result, the outlet chamber 69 communicates with the oil tank 19.

The wheel angular deceleration sensor 21 comprises a flywheel 72 borne rotatably and slidably on the drive shaft 42 through a bearing bush 86, a cam mechanism 73 transmitting the rotational torque of the drive shaft 42 to the flywheel 72 and transforming an overrunning rotation of the flywheel 72 into an axial displacement thereof, and an output lever mechanism 74 capable of actuating the exhaust pressure valve 20 in response to the axial displacement of the flywheel 72.

The cam mechanism 73 is constituted of a drive cam plate 82 fixed to the drive shaft 42, a driven cam plate 83 disposed opposite to the drive cam plate 82 for relative rotation, and a thrust ball 84 engaging with cam recesses 82a, 83a formed on opposed surfaces of both the cam plates 82, 83.

As shown in FIG. 5, the cam recess 82a of the drive cam plate 82 is inclined so that the bottom becomes increasingly shallower in a direction 85 of rotation of the drive shaft 42, and the cam recess 83a of the driven cam plate 83 is inclined so that the bottom becomes increasingly deeper toward the rotational direction 85. Accordingly, in a normal case the drive cam plate 82 assumes a driving side position in relation to the driven cam plate 83, the thrust ball 84 engages both the cam recesses 82a, 83a at their deepest portions, the torque received by the drive cam plate 82 from the drive shaft 42 is transmitted only to the driven cam plate 83, so that relative rotation is not caused between the cam plates 82, 83. However, if the position is reversed and the driven cam plate 83 overruns the drive cam plate 82, relative rotation is caused between the cam plates 82, 83, the thrust ball 84 rolls to climb the inclined bottoms of both the cam recesses 82a, 83a to impart thrust to both the cam plates 82, 83, and thus axial displacement is caused on the driven cam plate 83 in a direction moving away from the drive cam plate 82.

The driven cam plate 83 is borne rotatably on a boss 72a of the flywheel 72 and also engages one side of the flywheel 72 through a frictional clutch plate 87. A push plate 89 is provided additionally on the other side of the flywheel 72 through a thrust bearing 88.

The output lever mechanism 74 is provided with a bearing shaft 90 projecting from the casing body 22a at a position intermediately of the drive shaft 42 and the exhaust pressure valve 20, and a lever 91 supported axially swingably on a nose portion of the bearing shaft 90. The lever 91 is constituted of a long first arm 91a extending from the bearing shaft 90 while surrounding the drive shaft 42, and a short second arm 91b extending from the bearing shaft 90 toward the exhaust pressure valve 20, and an abutment portion 93 coming into contact with an outside surface of the push plate 89 is formed bulgingly at an intermediate portion of the first arm 91a.

A spring 94 is provided between the tip end of the first arm 91a and the casing body 22a, and the tip end of the second arm 91b comes in contact with an outer end of the valve body 67 of the exhaust pressure valve 20.

The resilient force of the spring 94 works on the lever 91 to press the abutment portion 93 of the first arm 91a to the push plate 89 and also normally press the valve body 67 of the exhaust pressure valve 20 to keep it in open state. Then, the force received by the push plate 89 from the spring 94 imparts a constant frictional engaging force to the flywheel 72, the frictional clutch plate 87 and the driven cam plate 83 and also imparts an access force to both the cam plates 82, 83.

Further, the above frictional engaging force is set so that the frictional clutch plate 87 slides when a rotational torque on or above a given value is generated between the driven cam plate 83 and the flywheel 72.

An operation of the embodiment will be described next.

While a vehicle is travelling, the drive shaft 42 is acceleratedly driven by the rotating front wheel 2 through the transmission device 48, then the flywheel 72 is driven through the cam mechanism 73 and the frictional clutch plate 87 so that the flywheel 72 rotates faster than the front wheel 2. Accordingly, a large rotational force of inertia is given to the flywheel 72.

Then, the eccentric cam 26 of the hydraulic pump 16 is rotated through the drive shaft 42 simultaneously with the rotation of flywheel 72.

When the master cylinder 5 is actuated for braking the front wheel 2, its output hydraulic pressure is supplied to the disc brake 3 by way of the upstream pipe 15a of the hydraulic conduit 15, the hydraulic chamber 36 of the hydraulic pump 16, the input hydraulic chamber 54 of the modulator 17, the valve chamber 58, the valve port 59, the output hydraulic chamber 55 and the downstream pipe 15b of the hydraulic conduit 15 in that order, and the brake 3 is actuated accordingly to apply brake force to the front wheel 2.

On the other hand, since the output hydraulic pressure of the master cylinder 5 is introduced into the hydraulic chamber 36 in the hydraulic pump 16, a reciprocating motion is caused to the pump piston 28 according to a push action of the hydraulic pressure to the actuating piston 29 and a lift action of the eccentric cam 26 to the push rod 27. Further, in a suction stroke whereat the pump piston 28 is moved toward the push rod 27, the suction valve 38 opens, and an oil in the oil tank 19 is sucked into the pump chamber 35 from the conduit 37 by way of the inlet chamber 31; in a discharge stroke whereat the pump piston 28 is moved toward the actuating piston 29, the unidirectional sealing member 39 opens, and an oil in the pump chamber 35 is fed to the outlet chamber 32 and further to the hydraulic control chamber 53 through the oil passage 57. Then, when pressure in the outlet chamber 32 and the hydraulic control chamber 53 rises to a predetermined value, the pump piston 28 is held in contact with the plug 34 by the pressure of the outlet chamber 32.

The hydraulic control chamber 53 of the modulator 17 is at first interrupted from communicating with the oil tank 19 by closing of the exhaust pressure valve 20, therefore the hydraulic pressure fed from the hydraulic pump 16 to the chamber 53 works directly on the pressure reducing piston 46 to hold it at the retracted position, keeping the valve body 60 open by the valve opening rod 62. Thus the output hydraulic pressure of the master cylinder 5 is permitted to pass through the port 59.

Accordingly, brake force applied to the disc brake 3 is proportional to the output hydraulic pressure of the master cylinder 5 at initial stage of braking.

When angular deceleration is generated by the front wheel 2 owing to the braking operation, the flywheel 72 senses it and tends to overrun the drive shaft 42 by the stored inertial force in the flywheel 7. The relative movement of the flywheel 72 under this condition causes relative rotation between the cam plates 82, 83, to axially displace the flywheel 72 by the thrust generated by the rolling of thrust ball 84, forcing the plate 89 to press and move the lever 91. However, the angular deceleration of the front wheel 2 is low at a stage where there is no possibility of locking of the front wheel 2, which is not powerful enough to rock the lever 91.

However, when the front wheel 2 is about to lock according to an excessive brake force or a lowering in coefficient of friction of the road, the angular deceleration of the front wheel 2 sharply increases accordingly and a pressing force of the push plate 89 exceeds a predetermined value, swinging the lever 91 around the shaft 90 to compress the spring 94, therefore the second arm 91b of the lever 91 is swung to move apart from the valve body 67, and the exhaust pressure valve 20 consequently opens.

When the exhaust pressure valve 20 opens, the hydraulic pressure of the hydraulic control chamber 53 is discharged to the oil tank 19 by way of the oil passage 70, the inlet chamber 68, the valve port 66, the outlet chamber 69, the oil passage 71, the inlet chamber 31 of the hydraulic pump 16 and the conduit 37, therefore the pressure reducing piston 46 is moved toward the hydraulic control chamber 53 by the hydraulic pressure in the output hydraulic chamber 55 against a force of the return spring 48. The valve opening rod 62 is thus retreated to allow the valve body 60 to close the port 59 so that the input and output hydraulic chambers 54, 55 are interrupted from communicating with each other, and the volume of the output hydraulic chamber 55 is increased. A braking hydraulic pressure working on the disc brake 3 is reduced consequently to decrease the brake force of the front wheel 2, and locking of the front wheel 2 can be avoided. Then, a pressing force of the push plate 89 onto the lever 91 is released in accordance as the front wheel 2 is accelerated, the lever 91 swings and returns to its original position by a reaction force of the spring 94, thus placing the exhaust pressure valve 20 in closed state. When the exhaust pressure valve 20 is closed, pressure oil discharged from the hydraulic pump 16 is immediately confined in the hydraulic control chamber 53 and the pressure reducing piston 46 is retreated toward the output hydraulic chamber 55 to boost the chamber 55, thus recovering the brake power. This operation is repeated at high frequency and the front wheel 2 is braked efficiently.

In such brake devices, the antilock control unit 7 is supported on the fixed panel 14 which also bears the brake caliper 13, therefore a bracket for supporting the unit 7 is not particularly required. And since the transmission device 48 is housed in the annular recess 8a formed on the hub 8 and is covered by the fixed panel 14, an exclusive cover means for the transmission device 48 is not particularly required, accordingly.

Figure 8:
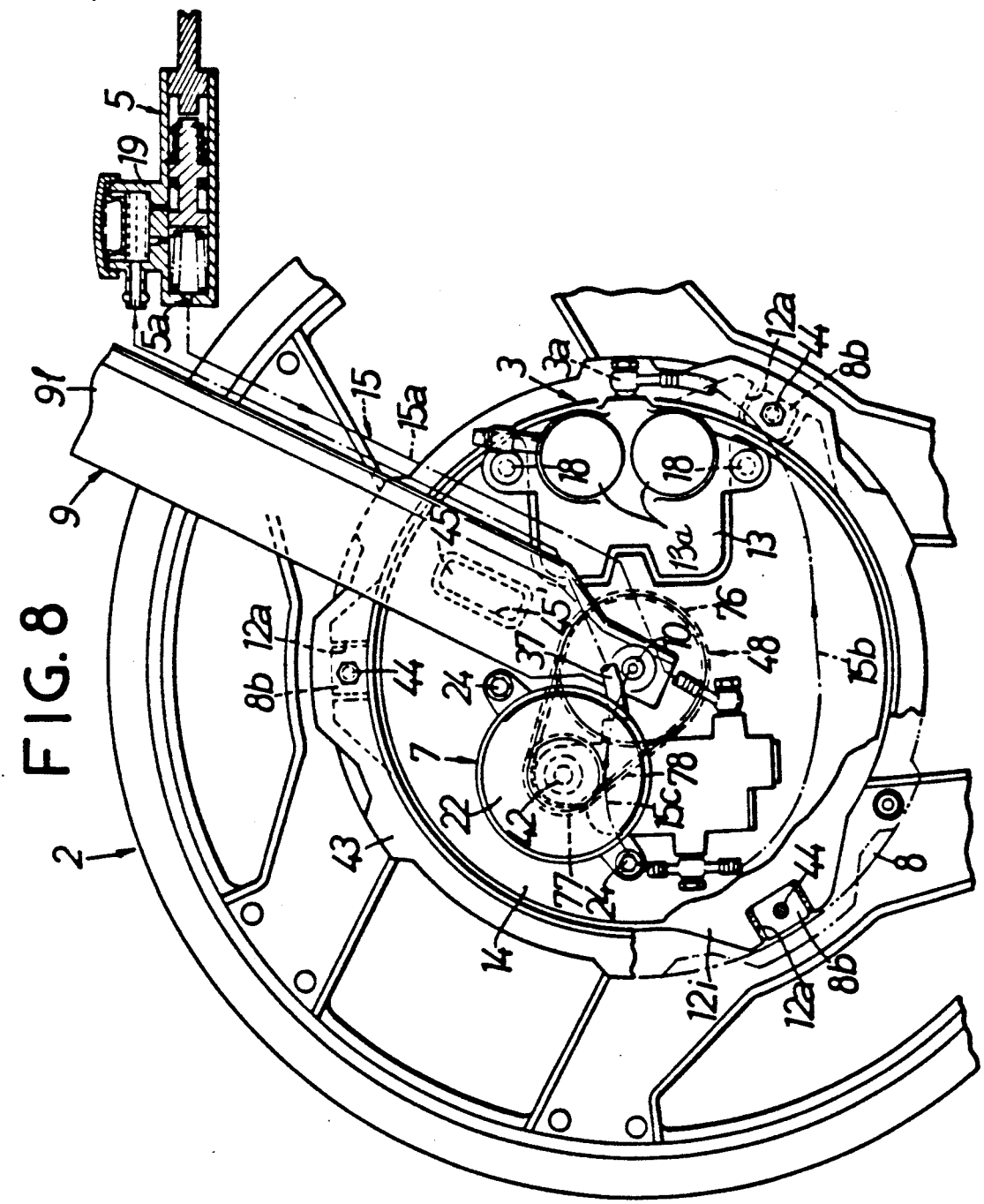
FIG. 8 is an enlarged side view of a main part of FIG. 7.
Figure 9:
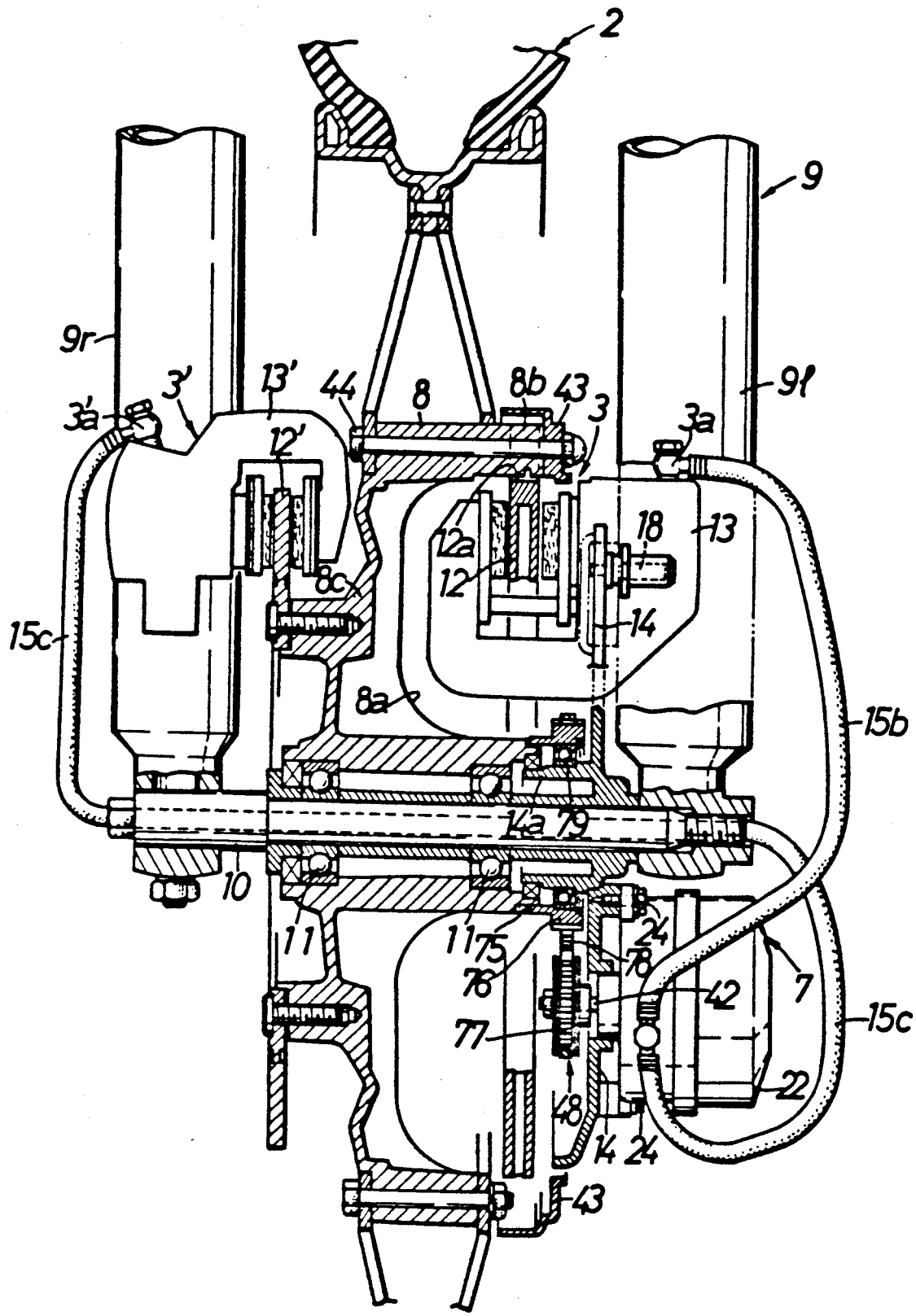
FIG. 9 is a longitudinal sectional view of FIG. 8.

FIGS. 7 to 9 represent the second embodiment of this invention, which is different from the first embodiment in that an outboard type disc brake is further disposed on the side of the wheel hub opposite to the side at which the inboard type disc brake is housed in the annular recess of the hub.

As shown in FIG. 9, an outboard type disc brake 3' is disposed on the side counter to that on which the annular recess 8a of the hub 8 is provided. The outboard type disc brake 3' is constituted of an outward brake disc 12' fixed to one side of a wall 8c of the hub 8, and a brake caliper 13' supported on a fork leg 9r as straddling over the brake disc 12' from an outer peripheral side of the disc, the caliper 13' being adapted to clamp the brake disc 12' upon receipt of hydraulic pressure in the caliper cylinders 13a.

A downstream pipe 15c, connecting an input port 3'a of the outboard type disc brake 3' and the output hydraulic chamber 55 (FIG. 5) of the antilock control unit 7, is arranged so as to pass through a hollow portion formed in the axle 10 as shown in FIG. 9. Accordingly, hydraulic pressure fed from the output hydraulic chamber 55 at the time of braking operation is transferred to the inboard type disc brake 3 by way of the downstream pipe 15b and also transferred to the outboard type disc brake 3' by way of the downstream pipe 15c, and thus both the brakes 3, 3' are controlled likewise by the antilock control unit 7.

As described, in the second embodiment, the outboard type disc brake 3' is disposed on one side of the hub 8 of the front wheel 2, and also the inboard type disc brake 3 is disposed in the annular recess 8a open to the other side of the hub 8, so that both the disc brakes 3, 3' are disposed close to each other in the axial direction of the front wheel 2 and also close to the antilock control unit 7.

Despite the two inboard and outboard type disc brakes being employed on one wheel, the brake device can be constituted compactly, and the invention is particularly useful when applied to smaller vehicles such as motorcycle and the like.

Further, the hydraulic conduit connecting between the input port of the outboard type disc brake and the output hydraulic chamber of the antilock control unit is arranged so as to pass through the hollow portion formed in the axle, therefore the layout can be simplified, and the hydraulic conduit does not interfere, in most cases, with maintenance or other servicing of associated equipment.

What is claimed is:
1. A brake device for a motorcycle having a wheel carried on a wheel supporting member via an axle extending substantially perpendicularly with respect to said axle, comprising a master cylinder, a disc brake actuated by output hydraulic pressure from the master cylinder to apply a brake force to said wheel, an antilock control unit incorporating a transmission device, an inertia type wheel angular deceleration sensor driven by said wheel through the transmission device and controlling the output hydraulic pressure of said master cylinder in response to an output from the sensor, an annular recess formed on the wheel and open to one side of said wheel, said disc brake being housed in said annular recess, a disc brake caliper of said disc brake and a fixed panel, said disc brake caliper and said antilock control unit are supported on said fixed panel disposed so as to close an opening of said annular recess, wherein said antilock control unit and said disc brake caliper are located on opposite sides of said wheel supporting structure when viewed in a lateral direction of the motorcycle and wherein said transmission device is housed in said annular recess.

2. A brake device for a motorcycle as defined in claim 1, wherein said wheel has a hub, and said annular recess is provided on the hub.

3. A brake device for a motorcycle as defined in claim 2 further comprising an outboard type disc brake disposed on a side of the wheel opposite to said one side at which the annular recess is opened.

4. A brake device for a motorcycle as defined in claim 3, wherein said vehicle is a motorcycle and said wheel is a front wheel, and wherein said antilock control unit further includes a modulator which is disposed outside the annual recess while said disc brake further includes a disc and a caliper cylinder connected to the modulator via a pipe, said disc being housed in the annular recess, said caliper cylinder and said pipe being disposed outside the annular recess.

5. A brake device for a motorcycle as defined in claim 1 further comprising an outboard type disc brake disposed on a side of the wheel as opposite to said one side at which said annular recess is opened.

6. A brake device for a motorcycle as defined in claim 5, wherein said antilock control unit further includes a modulator which is disposed outside the annular recess while said disc brake further includes a disc and a caliper cylinder connected to the modulator via a pipe, said disc being housed in the annular recess, said caliper cylinder and said pipe being disposed outside the annular recess.

7. A brake device for a motorcycle as defined in claim 5, wherein said outboard type disc brake is mounted on a means for suspending and supporting said wheel on a body of said vehicle.

8. A brake device for a motorcycle as defined in claim 1, wherein said antilock control unit further comprises a modulator which is formed together with said sensor into a unitary structure carried on the fixed panel.

9. A brake device for a motorcycle as defined in claim 8, wherein said antilock control unit is disposed on a front side of the wheel supporting structure and said disc brake is disposed on a rear side of the wheel supporting structure in a travelling direction of the motorcycle.

* * * * *